Oct. 30, 1945.  E. GRAY  2,387,843
LOCOMOTIVE POWER DRIVE
Filed July 1, 1942  3 Sheets-Sheet 1

Inventor
*Edward Gray, deceased*
*Agnes Gray, Admx.*
By
*Barthel & Bugbee*
Attorneys Oct. 30, 1945. E. GRAY 2,387,843
LOCOMOTIVE POWER DRIVE
Filed July 1, 1942 3 Sheets-Sheet 2

Inventor
Edward Gray, deceased
Agnes Gray, Admx.
By
Barthel & Bughee
Attorneys

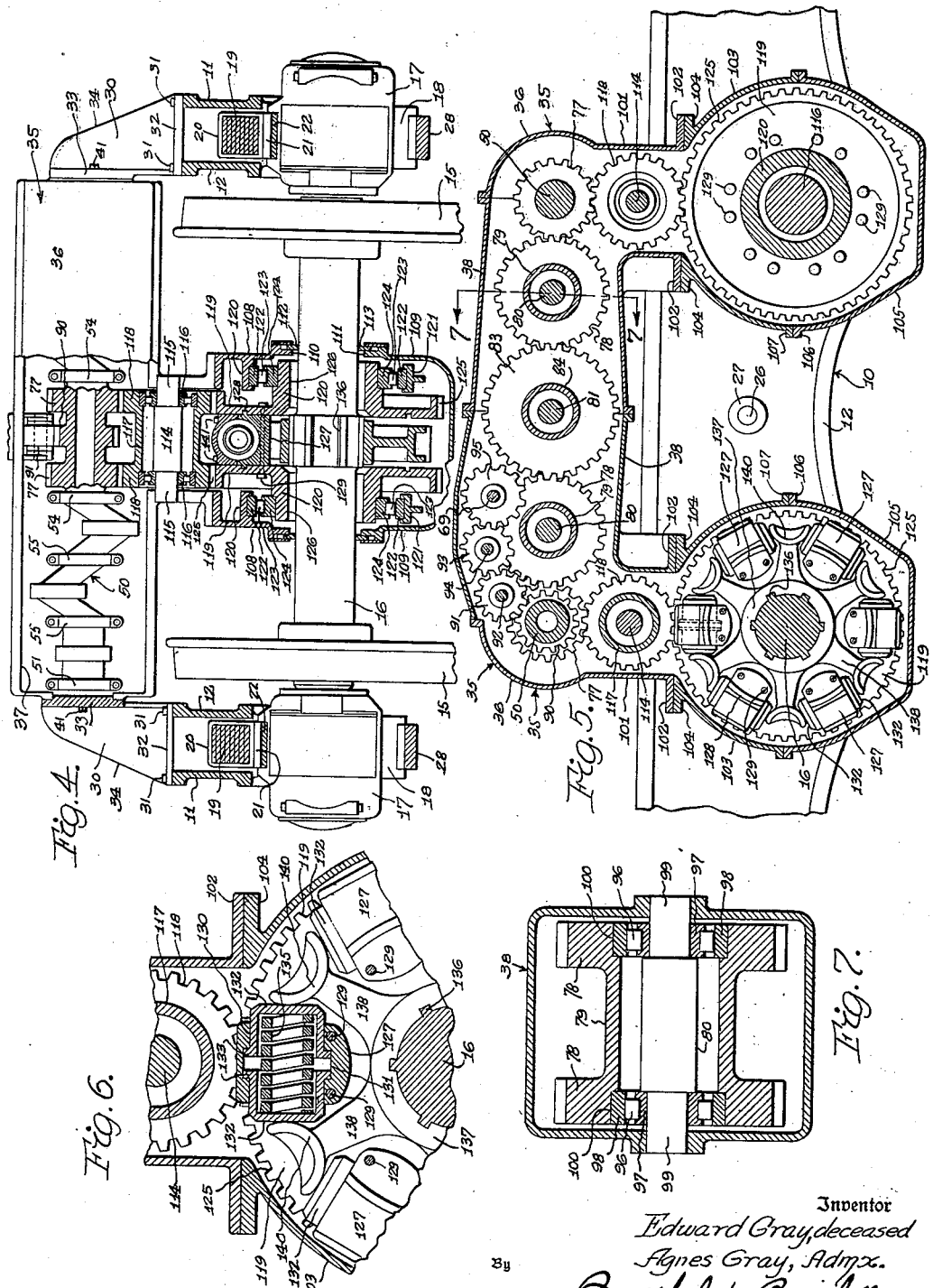

Patented Oct. 30, 1945

2,387,843

UNITED STATES PATENT OFFICE 2,387,843

LOCOMOTIVE POWER DRIVE

Edward Gray, deceased, late of Detroit, Mich., by Agnes Gray, administratrix, Grosse Pointe Park, Mich.

Application July 1, 1942, Serial No. 449,234

6 Claims. (Cl. 105—131)

The present invention relates to locomotive drive trucks and more particularly to a drive truck having opposed poppet type engines.

The primary purpose of the invention is to provide a locomotive drive truck and drive therefor which will prevent the transmission of impulses to the train and which will develop greater horsepower than has heretofore been attained in locomotive drives.

Another object of the invention is to provide a locomotive drive truck having opposed type poppet valve motors to drive the truck wheels by connecting the motors so that one opposed motor may drive two axles which is accomplished by arranging the motors so that the crank shaft of each opposed motor is directly above a drive axle.

Another object of the invention is to provide a locomotive drive truck and drive therefor in which an opposed type motor is adapted to span and drive a pair of adjacent drive axles and in which a spring drive is employed for connecting the opposed motor crankshaft to the drive axles so that impulses to the drive axle will be dampened and not transmitted to the train.

Another object of the invention is to provide a locomotive drive truck employing an opposed cylinder type motor in which gearing is provided for connecting the independent crankshafts of the motor to drive in a unidirectional manner so that the drive wheels will rotate correspondingly.

Another object of the invention is to provide a spring drive between the crankshaft of each end of the opposed cylinder motor and the drive axle which will allow slight play therebetween to compensate for relative movement between the drive truck frame and the suspended drive axles supported thereby.

Other objects and advantages of the invention will become apparent during the course of the following description of the accompanying drawings, wherein Figure 1 is a top plan view of a locomotive drive truck embodying the invention, illustrating a portion of the opposed piston type motor broken away to illustrate details of construction;

Fig. 4 is a vertical cross sectional view taken on lines 4—4 of Fig. 2 looking in the direction of the arrows illustrating the spring drive construction between the opposed piston type motor and the drive axles of the locomotive truck;

Fig. 5 is a longitudinal cross-sectional view taken on lines 5—5 of Fig. 1 looking in the direction of the arrows, showing in detail the various drive gears connecting the crankshafts together and the gearing between the crankshafts and drive axles;

Fig. 6 is an enlarged fragmentary sectional view of the spring drive between one of the opposed piston type motors and one of the drive axles, and Fig. 7 is a vertical cross-sectional view taken on line 7—7 of Fig. 5 looking in the direction of the arrows showing one of the structures of one of the intermeshing gears connecting the intermediate gear with the gear on the crank-shaft.

General arrangement

Figure 1:
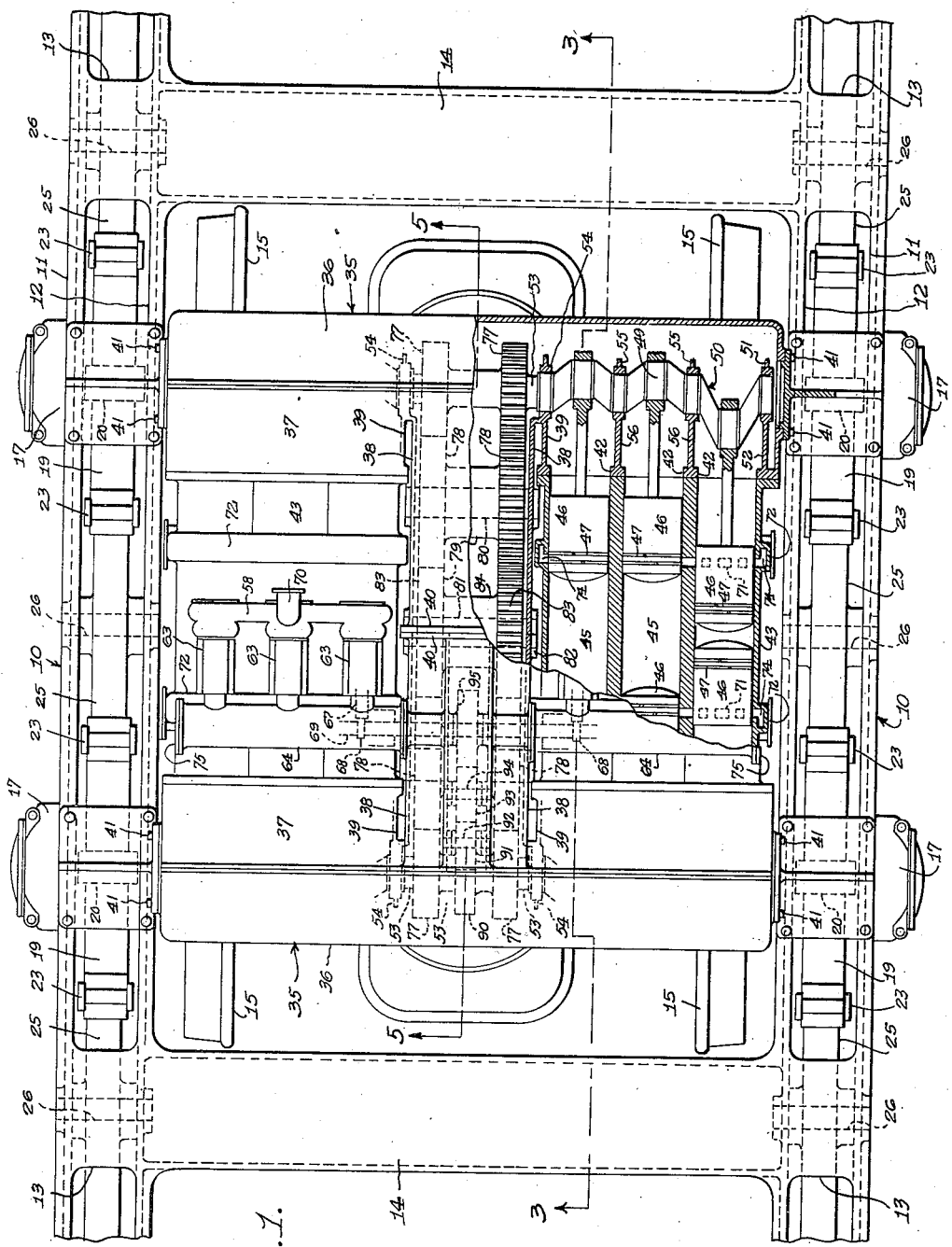
Figures 2, 3:
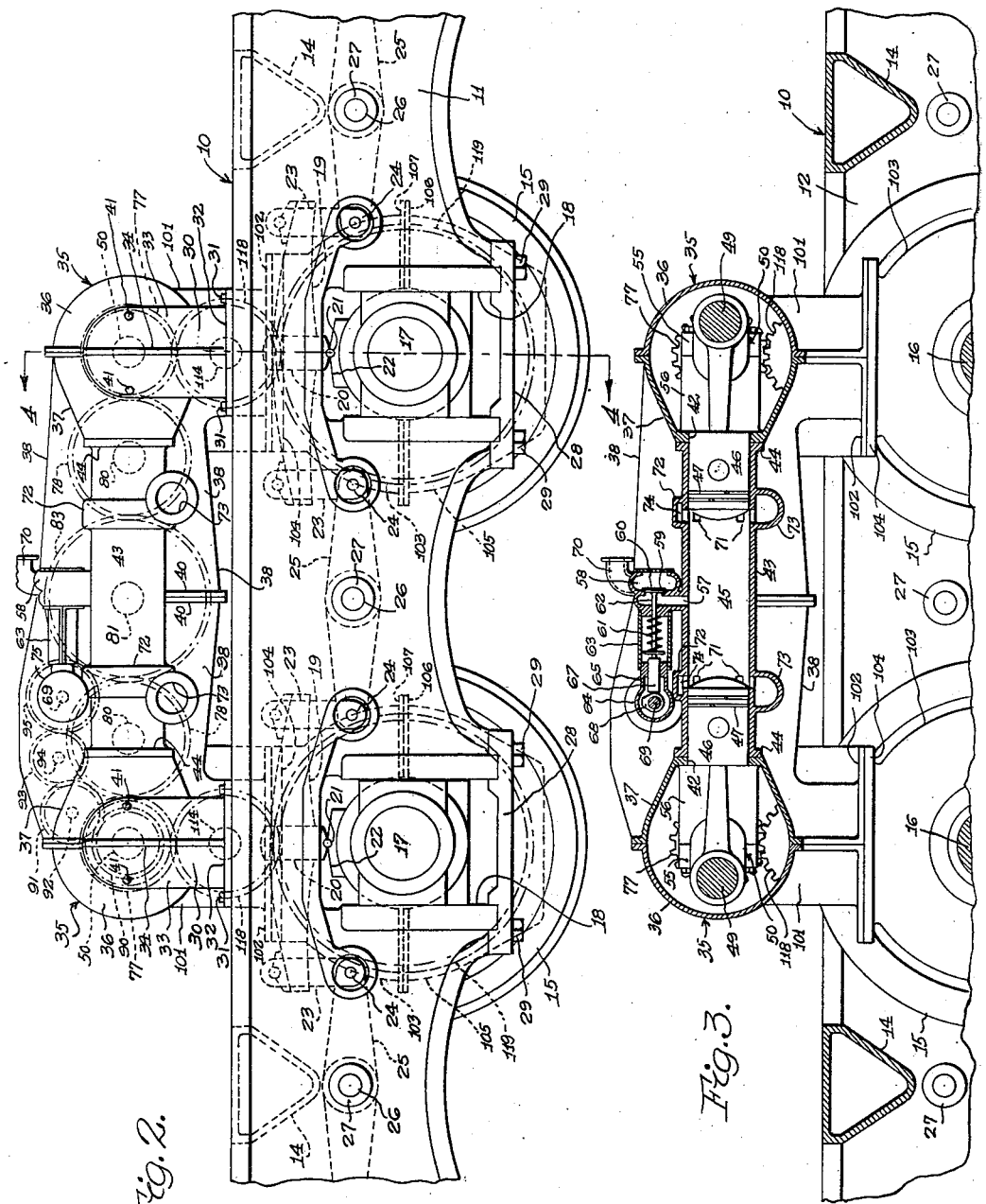
Fig. 2 is a side elevational view of the locomotive drive truck illustrating the manner in which the opposed piston type motor is bridged between adjacent pairs of drive axles.
Fig. 3 is a longitudinal cross-sectional view taken on line 3—3 of Fig. 1 looking in the direction of the arrows further showing details of construction relative to the opposed piston type motor.

The invention comprises a locomotive drive truck having a series of drive axles and drive wheels connected thereto. The drive axles are adapted to be arranged in pairs so that any adjacent pair may be connected and bridged by an opposed piston type motor having poppet valves and suitable gearing therefor. Further, the invention includes a spring drive interposed between the independent crankshafts of the opposed piston type motors so that the vibration of the power impulses transmitted to the drive axles will be dampened and will not be communicated to the train of cars being pulled by the locomotive.

The invention also contemplates an arrangement of motor and crankshaft structures supported to drive independent drive axles and wheels in which slight play is provided for between the motor and drive axles so that the supporting springs of the drive truck will be allowed to resiliently support the truck and absorb rail vibration due to joints and switch banks.

In the drawings wherein for the purpose of illustrating the invention and wherein like reference characters will be employed to designate like parts throughout the same, the reference character 10 will generally be employed to represent a locomotive drive truck including spaced side frame members 11 and 12 connected throughout their length by integral web portions 13. The side frame bars are connected by transverse frame bars 14 which are tubular and are generally triangular in shape in cross section.

The locomotive drive truck 10 is adapted to be supported by wheels 15 carried on transverse axles 16 suitably mounted in journal boxes 17 slidably arranged within the slide opening 18. Interposed between the side frame members 11 and 12 above each of the axles 16 is a leaf spring 19 comprising a series of segments securely held together by a clevis or the like 20. A roller 21 is interposed between the clevis 20 and a bearing block 22 carried on the upper end or top wall of the journal box 17. The free ends of the leaf springs 19 are provided with suspension straps 23 the lower ends of which are pivotally connected as at 24 to an equalizing lever 25 pivoted intermediate its ends on a pivot pin 26 rockably mounted in bearing bosses 27 in each of the side frame members 11 and 12. The lower end of the journal box slide is closed by means of a bar 28 secured in position at its free end by being bolted or otherwise secured as at 29 to the frame bars. As shown, in the drawings, the springs 19 and equalizing levers 23 are mounted between each pair of side frame members 11 and 12 so as to be completely housed and to limit lateral motion between the frame 10 and the wheels 15.

The upper edges of the side frame members 11 and 12 are adapted to support a series of motor brackets 30 and it is intended to position a motor bracket 30 above each of the axles 16 for a purpose which will be hereinafter more fully described. The motor brackets 30 are anchored in place by means of machine screws or the like as at 31 and each of the brackets comprises a base portion 32 having an upstanding web 33 reinforced by means of a transverse web 34 connecting the base 32. In the construction above described it will be noted that the motor supporting brackets 30 are in opposed relation and supported therebetween is a crank case generally designated as at 35. The crank case 35 is likewise arranged directly above the drive axle 16 and it is to be noted that one section of the crank case 35 is formed of a continuous casting 36 while the other section is divided to provide crank case sections 37. Formed integral with the sections 37 of the crank case and interposed therebetween is a gear casing or housing 38 having one end formed integral with the side walls 39 of the crank case sections 37 while the top and bottom walls are formed as a continuation between the crank case sections 37. The gear housings 38 are mounted in opposed relation and are provided with flanges 40 at the ends thereof to facilitate the bolting together of the gear housing sections 38. The crank case sections 36 and 37 are adapted to be supported between the webs 33 of the motor brackets 30 and bolts or the like as at 41 may extend through the brackets and be threaded in the end wall of the crank case 35.

Formed in the opposed portions of the crank case sections 37 are openings 42 which are adapted to align with opposed cylinders 43 having flanges 44 at the opposite ends thereof for being bolted to the crank case sections 37. The cylinders 43 may be cast in sections of three or more cylinders each to provide expansible fluid chambers 45. Reciprocably mounted within each end of the cylinder 43 is a piston 46 having the usual packing rings 47 and each piston is provided with a connecting rod connecting the throw 49 of a crank shaft generally indicated as at 50. The ends of the crank shaft 50 are journaled in suitable bearings 51 supported from the crank case sections 37 by means of suitable brackets 52. The intermediate portion of the crank shaft 50 is provided with a relatively straight shaft 53 the ends of which are supported in bearings 54 formed as a continuation of the inner walls 39 of the crank case sections 37. Additional bearing supports 55 are provided between the bearing supports 51 and 54 and said bearing supports 55 are formed as an integral part of the crank case by suitable webs or the like as at 56.

Intermediate the ends of each cylinder 43 is an inlet port 57 having communication with a manifold 58 through a valve port 59. The valve port 59 is adapted to be closed in timed relation to the movement of the pistons 46 by means of a poppet type valve 60 normally held seated by means of a coil spring 61 encircling the valve stem 62 thereof. Secured to each of the intake ports 57 is a cylindrical housing into which the valve stem 62 projects and said cylindrical housing 63 is connected to a circular housing 64 by means of a tubular boss 65. Reciprocably mounted in the tubular boss 65 is a valve plunger 67 one end of which is adapted to engage the poppet valve stem 62 while the opposite end is presented in the path of a valve operating cam 68 mounted on the cam shaft 69. It is to be noted that the cylindrical cam shaft housing 64 extends transversely of the cylinders 43 in parallel relation to the manifolds 58 so that steam when admitted to the manifold through a pipe connection 70 will pass through the manifold toward each end and be distributed in timed relation between the opposed pistons 46 to cause the usual expansion thereof in the expansible fluid chamber 45.

Adjacent the ends of each cylinder 43 is a series of exhaust ports 71 housed by an annular casing section 72 to collect the exhaust gases or steam and convey it to a transversely extending exhaust manifold 73 connecting each of the annular passageways 74.

The cam shaft 69 projects through the gear housing 38 and has its ends supported in suitable bearings in the end plates 75. The cams 68 are arranged on the cam shaft in suitable spaced relation so as to be aligned with the valve stem plungers 67.

Mounted between the ends of each of the crank shafts 50 is a pair of spaced gears 77 and said gears may be keyed or otherwise secured to the cam shaft on the straight shaft portion 53 thereof to rotate therewith. The gear wheels 77 are in mesh with spaced gear wheels 78 mounted on a hub 79 rotatably mounted on a suitable pivot pin 80 supported in the side walls of the gear housing 38. Likewise, a pinion supporting pin 81 is mounted in suitable bearing bosses 82 adjacent the inner connected ends of the gear housing 39 so that a pair of spaced gears 83 mounted on a connecting hub 84 will interconnect and mesh with the gears 78 on each side thereof. It is to be noted that the gears 78 are mounted on opposite sides of the central gear 83 so that the crank shafts 30 will be interconnected and will drive in unison and in timed relation one to the other.

Formed on one of the crank shafts 50 between the gears 77 is a gear wheel 90 which is adapted to mesh with a similar wheel 91 rotatably mounted on a shaft 92 carried by and between the side walls of the gear casing 38. Likewise, a gear wheel 93 is rotatably mounted on a shaft 94 and is positioned so as to mesh with the gear wheel 91. The cam shaft 69 is provided with a gear wheel 95 in mesh with the gear wheel 93 and said gear wheel 95 is mounted on the cam shaft by means of keys or the like to turn therewith and is positioned intermediate the ends of said cam shaft. The gears 90 to 95 inclusive provide suitable valve gearing for operating the cam shaft 69 in timed relation so that one set of pistons will be expanding while another set is being moved to a re-expansion position.

The gears 78 and 82 may be supported on spindles as shown in Fig. 5 and the ends of said spindles as shown in Fig. 7 are mounted in bearings 96 including inner and outer raceways 97 and 98 respectively, between which are positioned suitable roller bearings. The ends of the spindle 80 are preferably reduced as at 99 to accommodate the inner race member 97 and the ends of the interconnected gears 78 are cut away as at 100 to receive the outer raceway 98. It is intended to provide a bearing structure as shown in Fig. 7 in each of the gears 78 and 83 on their respective shafts 80 and 81.

Depending from the central portion of each of the crank cases 85 is a gear housing section 101 having a flange 102 on the lower portion thereof for receiving the upper section of a circular gear housing 103. Bolts or the like may be provided for coupling the flange 104 of the circular gear housing section 103 to the depending crank shaft housing 101. The circular gear housing 103 is provided with a lower section 105 having a flange 106 for being bolted to the flange 107 in the upper section 103 thereby completing a circular gear housing formed of divided sections 103 and 105 having side walls 108 and 109 respectively. The divided gear housing is adapted to surround the axle 16 and the side walls 108 and 109 are arcuately cut away as at 110 and 111 respectively and are spaced from the axle to arrange a proper clearance therebetween. The arcuate cut away portion 110 is provided with a packing 112 and likewise the arcuate cutaway portion 111 is provided with a packing 113 adapted to engage the axle 16 and prevent the displacement of oil or other lubricating material.

Rotatably mounted in each of the depending crank shaft sections 101 is a spindle 114 the ends of which, as at 115, are suitably journaled and are provided with roller bearing members 116 similar to the construction shown in Fig. 7. Rotatably mounted on the spindle 114 and supported by the roller bearing 116 is a cylindrical gear hub 117 having formed adjacent its ends gear sections 118. The gear sections 118 are adapted to mesh with the gears 77 mounted on the straight portion 53 of the crank shaft 50 and said gear sections are drivingly connected to a pair of spaced ring gears 119 having hub portions 120 which extend outwardly toward the side walls 108, 109 of the upper and lower gear casing sections 103 and 105. Formed integrally with the upper circular gear housing section 103 and extending inwardly between side walls thereof is a pair of roller bearing supports 120 which are circular in shape so as to partially encircle the axle 16. A pair of similar bearing supports 121 are suitably carried by the lower section of the gear housing 105 and are extended to provide a circular support in the outer raceway 122 of a roller bearing structure including roller bearings 123 spaced between the outer raceway 122 and an inner raceway 124 secured to the hubs 120 of the ring gears 119. The ring gear sections 119 are provided with peripheral flanges having gear teeth 125 which are adapted to mesh with the gear wheel 118 on the spindle 114. It will thus be noted that rotation of the crank shaft 50 will cause rotation of the ring gear sections 119 within the circular gear housing including the sections 103 and 105. It is also to be noted that the inner circumference 126 of the ring gear hubs 120 is slightly larger than the diameter of the axle 16 to allow relative play between the axle and the hubs 120 when the springs 19 of the truck are flexed during the passage over rough trackways.

Interposed between the ring gear sections 119 and spaced circumferentially therearound is a series of blocks 127 adapted to be held in place by means of a projection or recess 128, as shown clearly in Fig. 4. A series of bolts 129 are adapted to extend through the ring gear sections 119 and each of the blocks 127 to clamp the blocks therebetween and to anchor the same against movement. Each of the blocks 127 as shown in Fig. 6 is provided with a pair of oppositely disposed bores 130 communicating with an enlarged central bore 131 and mounted in said bores 130 is a pair of oppositely disposed plungers 132 which are preferably formed hollow and are provided with flanges 133 operable in the enlarged central bore 131. A coiled spring 135 is mounted in the hollow plunger 132 so that the free ends thereof engage the end walls of said plungers to normally hold the same in opposed extended relation.

The structure above described is identical to the other plunger devices mounted circumferentially between the ring gear sections 119 and so it is only necessary to describe one of such devices.

The central portion of the axle 16 is provided with longitudinal keys 136 upon which is received and locked the hub 137 of a drive spider having arms 138 extending between adjacent pairs of plungers 132. The extreme free ends of the arms 138 are provided with arcuately curved plunger engaging portions 140 and said plunger engaging portions 140 are enlarged to span the distance between the adjacent plungers. Normally, the arcuately curved engaging portions 140 will rest between the plungers so that the coiled spring 135 will not be contracted and the flanges 133 of the plungers will be at the ends of the centralmost bore 131. Movement of the spindle arms 138 in a clockwise or a counterclockwise direction will compress the springs 135 and allow sufficient resiliency between the ring gear section 119 and the axle 116 thereby providing a spring which will absorb shocks and dampen the impulses of the motors so that the impulses will be prevented from being transmitted directly to the axle 16 with the resultant unevenness in motion of the truck. If desired, the circumferentially arranged blocks or plunger housing 127 may be formed in divided sections and held together by suitable connecting bolts 141 extending through the sections and provided with nuts on their free ends so that the divided sections will be clamped together and so that the sections may be separated in the event that it is desired to replace or repair the plungers and coiled springs 135.

Operation

In operation, steam is admitted to the manifold 58 by suitable connections through a throttle valve and locomotive boiler so that the steam will find its way in timed relation to the inlets 57 intermediate the ends of the cylinders 43. The steam will then expand and cause the pistons 46 to move outwardly thereby rotating the independent crank shafts 50 to drive the gears 118 and ring gear sections 119. Such drive will effect the rotation of the axle 16 through the resilient spring drive, including the spider arms 138 and the spring pressed plungers 132. The rotation of the axle 16 will thus propel the locomotive and it is to be noted that adjacent pairs of axles 16 are rotated in the same direction so that corresponding pairs of drive wheels 15 will propel the locomotive truck 10. The exhaust manifolds 73 may be connected to a condenser and thence to the boiler so that the steam condensation may be reused.

The invention disclosed and described in this application is intended to be used in the invention of my copending application Serial 447,977, filed June 22, 1942.

It is to be understood that the form of the invention herein shown and described is to be taken as a preferred embodiment of the same and that various changes in the shape, size and arrangement of parts may be resorted to without departing from the spirit of the invention or the scope of the subjoined claims.

What is claimed is:

1. In a drive truck for locomotives, a truck frame, side rails on said truck frame, drive axles spaced on said truck frame and movably journaled in said side rails, drive wheels for the drive axles between said side rails, an opposed piston type motor mounted on the frame and supported at each end by the side rails, with its crankshafts above a pair of adjacent axles, means connecting the crankshafts to the intermediate portions of said axles, and resilient drive means interposed in said last-mentioned means for absorbing the shock of impulses applied to the axles by the motors, said last-named means being directly mounted on said axles intermediate the ends thereof to provide a resilient drive between the crankshaft and drive axles.

2. In a drive truck for locomotives, a truck frame having side rails, drive axles and wheels for the frame movably journaled in the side rails thereof, a motor supported by the side rails of the frame, said motor having parallel crankshafts arranged to provide a crankshaft disposed above each axle, gearing connecting the intermediate portion of each crankshaft to its respective axle, and resilient means interposed in the gearing and mounted directly on each axle for absorbing impulse shocks transmitted to the axle and for permitting rocking movement and side sway of said motor and frame without causing damage to the gearing.

3. In combination with a locomotive drive truck having side rails and drive wheels and axles therefor movably journaled in said side rails, a motor mounted above the drive axles and supported between the side rails, a power shaft at each end of the motor, said motor being arranged with power shafts each disposed above a drive axle of adjacent pairs, gearing connecting the power shafts in pairs to facilitate simultaneous rotation of said shafts, gearing connecting the central portions of the power shafts with adjacent axles, and a resilient drive connection mounted directly on each axle and interposed between the gearing and axles to permit rocking movement and side sway of said frame upon deflection of said wheels.

4. In combination with a locomotive drive truck having spaced side frame members connected by spaced drive axles and drive wheels for said axles, a motor mounted on said frame having multiple parallel cylinders supported between the side frame members, opposed pistons reciprocably mounted in the cylinders, a crankshaft at each end of the motor adapted to be positioned above corresponding drive axles, gearing for drivingly connecting the central portion of said axles with the intermediate section of said crankshaft, and a resilient drive member directly mounted on said central portion of each axle operatively connecting the same with said gearing to permit rocking movement and side sway of said frame.

5. In combination with a locomotive drive truck having spaced apart side frame members and drive wheels supported by equidistantly spaced axles, a motor mounted on the frame comprising a motor casing having crankcases at each end thereof connected by a cylinder, said crankcases being supported at their ends on the side frame member, pistons mounted in said cylinder, a crankshaft in each crankcase, connecting rods connecting said pistons with the crankshafts, said motor casing being mounted to span certain spaced axles to position a crankshaft above each axle, gearing connecting the respective crankshafts and axles, and a spider arm member directly secured to the intermediate portion of each axle yieldingly and drivingly connecting said gearing thereto to permit rocking movement and sidesway of said frame.

6. In combination with a locomotive drive truck having side frame members and drive wheels supported by equidistantly spaced axles movably mounted between said frame members, a motor mounted on the frame comprising a motor casing having crankcases at each end thereof supported by and between said side frame members, said crank-cases being connected by a cylinder, pistons mounted in said cylinder in opposed relation, a crankshaft in each crankcase, connecting rods connecting the respective pistons with said crankshaft, said motor casing being mounted to span certain adjacent spaced axles to position a crankshaft above each axle, gearing connecting the central portions of said crankshafts, a spider arm member directly mounted on the intermediate portion of each axle, and a shock absorbing device interposed between said gearing and spider arm member to drivingly and yieldingly connect said crankshafts with their respective axles and absorb shocks and impulses of said motor while at the same time permitting rocking movement and side sway of said truck frame.

AGNES GRAY,
*Administratrix of the Estate of Edward Gray, Deceased.*